United States Patent

Hansen

[15] 3,650,884

[45] Mar. 21, 1972

[54] POLYAMIDE MONOFILAMENT HAVING A MICROPOROUS SURFACE LAYER

[72] Inventor: John Edward Hansen, Wilmington, Del.

[73] Assignee: E. I. du Pont de Nemours and Company, Wilmington, Del.

[22] Filed: July 20, 1970

[21] Appl. No.: 56,383

Related U.S. Application Data

[63] Continuation-in-part of Ser. No. 834,213, June 9, 1969, abandoned, which is a continuation-in-part of Ser. No. 616,956, Feb. 17, 1967, abandoned, and a continuation-in-part of Ser. No. 850,665, Aug. 15, 1969, which is a continuation-in-part of Ser. No. 673,287, Oct. 6, 1967, abandoned.

[52] U.S. Cl. ............................161/175, 152/357, 161/178, 161/180, 161/181
[51] Int. Cl. ...........................................................D02j 3/00
[58] Field of Search..................161/172, 175, 177, 178, 180, 161/181

[56] References Cited

UNITED STATES PATENTS 3,550,369  12/1970  Pitzl..................................161/180 X

FOREIGN PATENTS OR APPLICATIONS 616,048  1/1949  Great Britain
1,037,935  8/1966  Great Britain

*Primary Examiner*—Robert F. Burnett
*Assistant Examiner*—Raymond O. Linker, Jr.
*Attorney*—Sol Schwartz

[57] ABSTRACT

Highly drawn polyamide monofilaments having a diameter of at least 15 mils which have been subjected to steam at specified conditions possess properties that render them particularly suitable in tires. The steam-modified surface layer of the monofilament is microporous, resulting in a dye-penetration of 3–15 microns which depth constitutes less than 6 percent of the transverse radius of the monofilament. The monofilament has an X-ray orientation half-width that is no greater than about 12.5 degrees-chi.

6 Claims, 3 Drawing Figures

INVENTOR
JOHN EDWARD HANSEN

BY
ATTORNEY

POLYAMIDE MONOFILAMENT HAVING A MICROPOROUS SURFACE LAYER

This is a continuation-in-part of my copending application, Ser. No. 834,213, filed June 9, 1969, now abandoned, which is a continuation-in-part of my application, Ser. No. 616,956, filed Feb. 17, 1967, now abandoned and my application, Ser. No. 850,665, filed Aug. 15, 1969, which is a continuation-in-part of my application, Ser. No. 673,287, filed Oct. 6, 1967 now abandoned.

BACKGROUND OF THE INVENTION

The prior art describes the modification of polyamide filaments by means of steam treatment, British Pat. No. 1,037,935 (equivalent to Belgium Pat. No. 662,828) or Italian Pat. No. 804,131 and by means of radiant heat, flame, hot liquids and molten metal, British Pat. No. 616,048. Mechanical methods of filament modification are also known in the art. However, none of the prior art describes the product of the instant invention or specifically teaches how it may be obtained.

DETAILED DESCRIPTION OF THE INVENTION

In accordance with the present invention there is provided a polyamide monofilament having a diameter of at least 15 mils with such levels of straight tenacity, e.g. >7.5 g.p.d., loop tenacity, e.g. >2.3 g.p.d. and adhesion to rubber so as to render the same suitable as a replacement for the conventional tire cords that are composed of multifilament yarns.

The synthetic polyamides which are useful in the monofilaments of this invention comprise poly-ε-caproamide. polyhexamethylene adipamide, and copolymers of poly-ε-caproamide or polyhexamethylene adipamide. It is often desirable to add to the polyamide composition prior to extrusion an alkali metal halide as described in my parent application, Ser. No. 850,665. The presence of alkali metal halide permits extrusion of large diameter monofilaments with minimum formation of large voids that might adversely affect subsequent drawing as is necessary to obtain the high tenacity monofilaments.

A process by which the monofilaments of this invention may be prepared comprises:

1. extruding molten polyamide downwardly through an orifice into air;
2. quenching the monofilament in water;
3. heating and drawing the quenched monofilament to preferably at least 5.5 times its length before drawing;
4. exposing the drawn monofilament to saturated or wet steam and preferably for from 0.2 to 1.0 seconds at a temperature exceeding the melting point of the polyamide in the steam atmosphere and under sufficient tension to assure final filament length that is about 90 to 105 percent of its length before steaming; and
5. winding the steamed monofilament onto packages. Steps (3) and (4) may be directly coupled. In the examples, however, intermediate packaging of the monofilament is employed for convenience.

Steps (1) and (2) are performed in conventional manner. The monofilament is withdrawn from the water quench bath by a first set of skew rolls driven at a speed sufficient to pull the monofilament from the bath at a velocity barely exceeding the yarn-velocity provided at entrance to the quench bath by gravity alone. Some attenuation of the molten monofilament in the air gap occurs spontaneously. The diameter of the quenched monofilament is selected so that after drawing the desired diameter for the ultimate product is obtained.

The quenched monofilament of Examples I–VII is drawn in two coupled stages between feed and draw rolls. The draw rolls of the first stage serve as feed rolls for the second stage. Between each pair of feed and draw rolls, the monofilament passes through a radiant oven heated to between 500° to 750° C. Monofilament is drawn at a draw ratio of about 4X in the first stage and sufficiently more in the second stage that the total draw ratio is at least 5.5X.

After intermediate packaging, the monofilament is steamed on passage through a steaming chamber, which is in two sections along its center line and hinged for ease in stringing up the monofilament.

Figure 1:
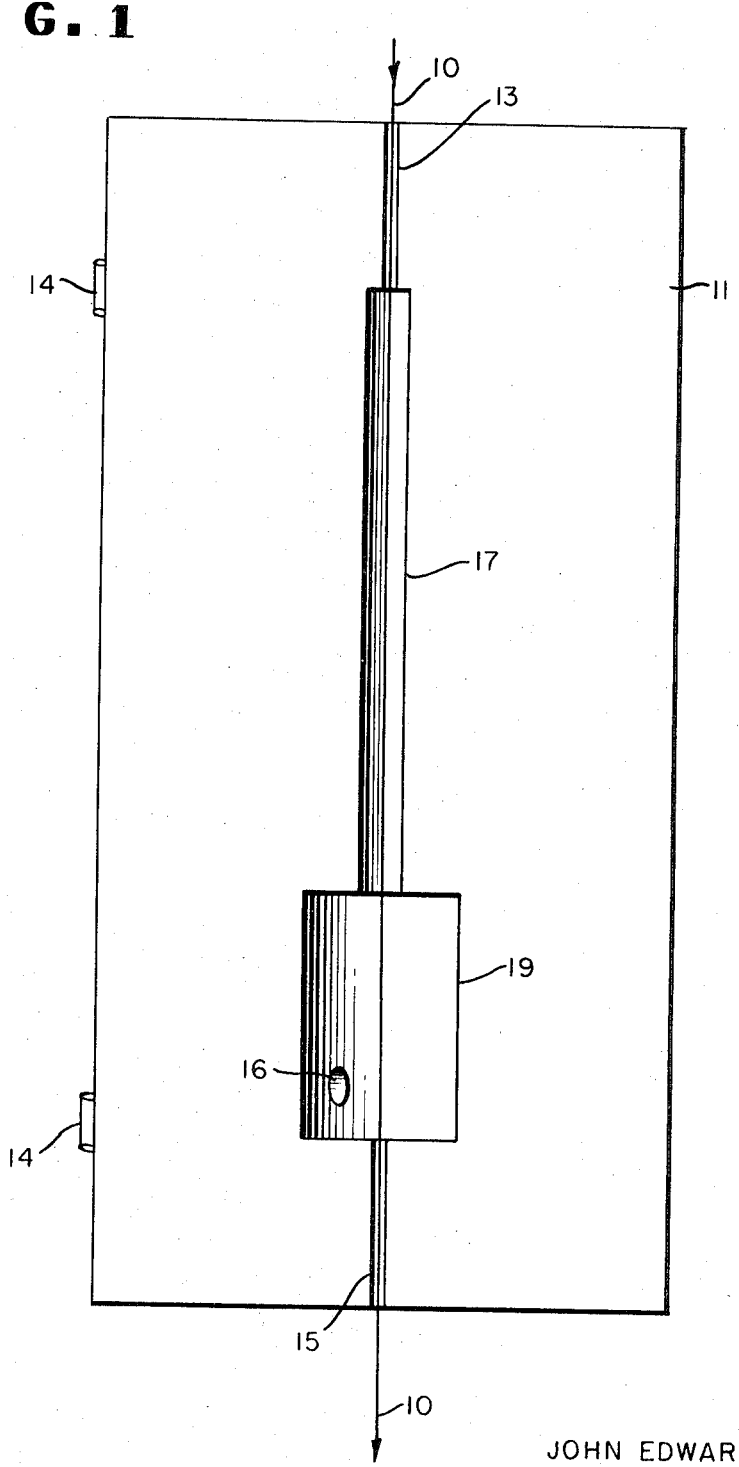
FIG. 1 is a schematic of an apparatus that is useful for steam treating monofilaments.

FIG. 1 is a view of the steaming chamber used in Examples I–VII as viewed normal to a surface revealed on opening up the hinged valves. Monofilament 10 passes downwardly along the center line. Interconnected yarn-passages 13, 17, 19, and 15 are formed into body 11 and in the other half (not shown) connected by hinges 14 so that, when the two halves are closed, each passage is symmetrical about the center line. Passages 13 and 15 are 60 mils square and 7 inches long. Passages 17 and 19 are round in cross section, passage 17 being 188 mils in diameter and 25 inches long, and passage 19 being 750 mils in diameter and 10 inches long. An opening 16 into passage 19 through one section is provided externally with pipe fittings (not shown) whereby steam is injected to contact running filament 10. Steam escapes through passages 13 and 15 at high linear velocities sufficient to keep the monofilament centered on passage therethrough. Total effective length of the steaming chamber is taken to be the sum of the lengths of passages 17 and 19 plus one-half the sum of the lengths of passages 13 and 15. In the examples, rolls feeding the monofilament to and withdrawing it from the steaming chamber are adjusted to provide from 0 to 4 percent shrinkage during steaming.

The saturated steam that is injected in the apparatus is preferably wet steam. Quality of wet steam is defined as the weight percentage water that is in the vapor phase. The quality of the steam employed in the examples is less than 100 percent, approximately in the range of from 94–98 percent. The temperature of the steam should equal or exceed the melting point of the polyamide in the steam atmosphere. Due to plasticization by steam however, the melting point is sharply reduced from that measured in a dry atmosphere. For the steaming of monofilaments of polyhexamethylene adipamide homopolymer, steam pressures are preferably in the range from 110 to 135 p.s.i.g. For poly-ε-caproamide homopolymers or for copolymers of either polyhexamethylene adipamide or poly-ε-caproamide, steam pressures are preferably in the range of 70 to 100 p.s.i.g.

The selection of process conditions from within the ranges cited above is dependent upon the degree of modification desired in the final filament. The polyamide composition of the monofilament and its diameter will also be factors which may require appropriate adjustment of contact time and steam pressures in order for products of the invention to be achieved.

Figure 2:
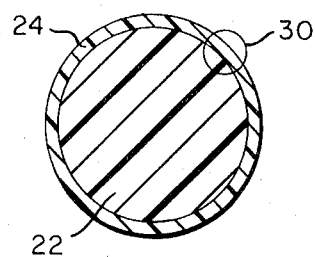
FIG. 2 is a schematic cross-sectional view of a steam treated filament of the invention and FIG. 3 an enlarged section thereof.
Figure 3:
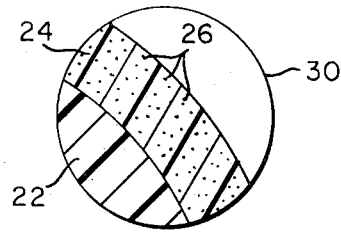

FIG. 2 is a schematically represented cross-section of a monofilament of this invention showing, in exaggerated scale, that a separately identifiable surface layer 24 surrounds a core 22. Viewed under a microscope at about 590X linear magnification, section 30 of FIG. 2 appears about as shown in FIG. 3, wherein it is seen that surface layer 24 has a high density of micropores 26.

Before steaming, the drawn monofilament has an outer layer that is highly oriented, crystalline, and impervious and is believed to be responsible for low dye penetration rate and poor adhesion to rubber.

Steaming causes disorientation of the surface layer and develops micropores which form from the outer surface inward as steaming progresses. Excessive steam treatment results in fine cracks forming in the core portion of the filament with corresponding sharp reduction in tensile and flexural properties. As shown in the examples, dye penetration is less than about 3 microns for unsteamed monofilaments. The extent of surface modification in the monofilaments of this invention is characterized by a depth of dye-penetration of between 3 microns and 15 microns, which depth is no greater than 6 percent of the transverse radius of the monofilament. Preferably the dye-penetration depth is 5–10 microns. A dye-exhaustion test is a measure of the microporosity of the monofilament. The monofilament should have an orientation half-width of no greater than 12.5 degrees-chi as determined by X-ray orientation techniques described in greater detail below. This degree of orientation is imparted by the extent of draw before steaming. Steaming as described causes no appreciable increase in orientation half-widths for the monofilaments.

MEASUREMENT TECHNIQUES

Tenacity

Before tensile testing, the monofilament in relaxed skein form is conditioned in the test atmosphere for at least 48 hours. The atmosphere is maintained at a temperature of 75 ± 2° F. and a relative humidity of 55 ± 2 percent. A recording stress/strain device is used wherein a 10 inch long section of monofilament is elongated at a rate of 12 in./min. until it breaks. During stress/strain testing, the monofil sample is gripped in air-activated Type 4D Instron clamps maintained at approximately 70 p.s.i. pressure. Tenacity is computed by dividing the breaking load in grams by the denier of the sample before testing.

Loop Tenacity

Loop tenacity is obtained analogously to the (straight) tenacity defined above. It differs only in that two lengths of monofilament are used, each forming a loop by having both ends fastened in the same jaw of the tester and the two lengths in opposite jaws so that one loop passes through the other and each straightened loop is about 6 inches long. Loop tenacity is computed by dividing the breaking load in grams by twice the denier of the individual monofilament before testing.

Dye Exhaustion

Microporosity of the monofilament may be characterized by a dye-exhaustion test. An aqueous solution is made containing 0.03 gm./100 ml. of the cobalt analog of the dye of Color Index 15675. A glass tube containing 200 ml. of the dye solution is equilibrated to treatment temperature in a constant temperature bath. A 5 gram sample of monofilament is immersed in the solution for 15 minutes, whereupon an aliquot of solution and the monofilament are removed. The treatment temperature for polyhexamethylene adipamide monofilaments is 80° C. To compensate for the inherently greater dyeing rates of poly-$\epsilon$-caproamide or copolymer monofilaments, a treatment temperature of 65° C. is employed. Standard light absorption techniques are used to measure concentration, C, of dye remaining in the aliquot. From the known initial concentration, $C_o$, percent dye exhaust, E, is computed as $$E = 100 \times (C_o - C/C_o)$$

Dye Penetration

A 1 cm. length of the dyed and dried sample from the dye-exhaustion measurement is embedded in polymethylmethacrylate, and 5 micron thick sections are cut with a diamond-knife microtome along a plane inclined 10° to 20° from a plane perpendicular to the fiber axis thereby resulting in elliptical sections. A portion of the monofilament in the plane of the cut surface, and including its surface layer at the extremes of the minor axis, is observed microscopically and photographed on Polaroid color film at a linear magnification of 590X. Apparent thickness of the dyed layer along the minor axis of the cut section, measured directly on the photograph, is divided by 590 to obtain the actual depth of dye penetration. In those instances where dye penetration at both ends of the minor axis appeared equal, only a single measurement was made and reported. In other instances dye penetrations were measured at both ends of the minor axis and the average reported in Table III. Oversteamed specimens exhibit diffuse dye boundaries; otherwise, the boundaries are sharp and thickness is readily measured.

X-ray Orientation Half-Widths

The volume of modified surface layer of the monofilaments of this invention is so small relative to total monofilament volume as to have negligible effect on orientation angle half-widths obtained by X-ray diffraction techniques on whole monofilaments. Definition of the X-ray parameters measuring crystalline orientation is to be found in Dismore, P.F., and Statton, W.O., J. Polymer Science, Part C, Vol. 13 (1966) p. 133. In the examples, X-ray orientation half-widths in degrees are obtained using a computer-controlled, three-circle, X-ray diffractometer. This technique is as described by L. E. Alexander in X-ray Diffraction Methods in Polymer Science, Wiley Interscience, N. Y. (1969) pp. 262–268. An equatorial scan locates the peak of the intensity maximum resulting from both the 100 and the 010, 110 doublet X-ray diffraction peaks. The detector is set at the 2-theta angle of 100 plane equatorial maximum, and a chi scan is performed; i.e., the monofilament is rotated about an axis bisecting the incident and diffracted X-ray beams, which axis is inclined at angle theta to the incident beam and which is normal to the monofilament axis. This is analogous to an azimuthal scan in flat-plate photometry. A peak is detected the width of which (in degrees of rotation) measured at the midpoint between the maximum and the baseline of background intensity for the peak, is the orientation half-width in degrees-chi. The higher the orientation, the smaller is the half-width. Monofilaments of this invention are highly oriented as evidenced by X-ray orientation half-widths of no greater than about 12.5 degrees-chi determined with the detector set at 2-theta for the 100 peak. Comparison of unsteamed and steamed pairs in Table III (e.g., A and Ac; C and Ca; E and Eb, and G and Ga) shows that steam-treating does not diminish the whole-filament orientation to any appreciable extent.

Relative Viscosity

Relative viscosity, (RV), as used herein, is the ratio of solution and solvent viscosities measured in a capillary viscometer at 25° C. The solvent is formic acid containing 10 percent by weight of water. The solution is 8.4 percent by weight polyamide dissolved in the solvent.

The following examples are presented to illustrate but not to restrict the present invention. Parts and percentages are by weight unless otherwise noted. The time referred to in the examples is the time in seconds during which the filament is inside the steam tube and is calculated by dividing the steam tube length by the linear input speed. In each example the monofilament was extruded and drawn as indicated.

EXAMPLE I

Monofilament is extruded from molten polyhexamethylene adipamide containing 2 percent by weight lithium bromide uniformly dispersed. The extruded polymer is a 50/50 by weight blend of two polymer supplies: one with an RV of 40 and containing 4 percent by weight lithium bromide, and the other with an RV of 50 and free from added salt. The monofilament is drawn 5.8X. In Tables I, II, and III, this drawn yarn is designated as monofilament A. Specimens of A are steamed in the steam tube described in connection with FIG. 1 and at steam pressures and residence times shown in Table I. Denier and equivalent diameter of these resultant monofilaments are also given in Table I. The steamed monofilaments of this example are designated Aa, Ab, Ac; and Ad.

Table II lists the physical properties of these monofilaments, and Table III the structural characterizations. It is seen that A, without steaming, is very deficient in loop tenacity, has very low dye penetration and dye exhaust. Steamed monofilaments Aa and Ab show the effects of insufficient steaming, Aa being steamed at a preferred temperature for too short a time and Ab being steamed at too low a temperature for a preferred exposure time. Ab shows the drastically lower loop tenacity characteristic of large monofilaments insufficiently steamed. Ac is a preferred monofilament of this invention. Ad is steamed overly long, resulting in lowered tenacity.

X-ray orientation half-widths all indicate high orientation. Except for monofilament A, the other monofilaments of this example exhibit good adhesion for tire applications as shown by simulated testing of resorcinol-formaldehyde-latex dipped filaments in cured two-ply sections of cord fabric.

EXAMPLE II

This example closely parallels Example I, the significant change being that the quenched monofilament is drawn only 5.5X. The unsteamed monofilament, B, has unacceptable loop tenacity. The steamed monofilament, Ba, has excellent loop tenacity and good adhesion as discussed in Example I.

EXAMPLE III

This example essentially duplicates Example I with the exceptions that the 50 RV polyamide with no added salt is used alone and the draw-ratio is 5.85X. The drawn monofilament, C, has a loop tenacity of only 1.5 grams/denier, whereas the drawn and steamed monofilament, Ca, has an excellent loop tenacity of 3.8 grams/denier. As shown in Tables II and III, the improvements on steaming render monofilament Ca suitable for replacing cord in tires in that all physical properties and structural characteristics fall within the required ranges.

EXAMPLE IV

Monofilaments are prepared and treated as in Example III except they are drawn only 4X, a level customary for drawn textile-denier yarns. All of these monofilaments are steamed. They are labeled Da, Db, and Dc in the Tables. These monofilaments exhibit a tenacity far below that necessary for constructing durable tires. An unsteamed sample had an orientation half-width of 15.1 degrees-chi.

EXAMPLE V

This example illustrates production of suitable monofilaments for tire-construction utilizing poly-$\epsilon$-caproamide (RV= 75) for extrusion. No halide salt is added. The quenched monofilaments are drawn 6.2X before steaming, E designating unsteamed monofilament and Ea, Eb, and Ec designating steamed monofilaments. Steaming conditions are shown in Table I. E has low loop tenacity, low dye penetration and low dye-exhaust. The physical properties and structural characteristics of all the steamed monofilaments are within the ranges required for this invention. Monofilaments (Ea) and (Ec) were not steamed to the preferred degree and do not exhibit optimum loop tenacities. Monofilament Eb is a preferred monofilament according to this invention.

EXAMPLE VI

This example shows monofilaments of 75 RV poly-$\epsilon$-caproamide containing 2 percent by weight of uniformly dispersed lithium bromide. The unsteamed monofilament, F, is drawn 5.6X. It possesses very low loop tenacity, low dye penetration, and low dye-exhaust. The steamed monofilament, Fa, has all the characteristics required for the improved monofilaments of this invention.

TABLE I

Steaming Conditions, Denier, and Diameter

| Monofilament | Steam Pressure p.s.i.g. | Time (sec.) | Denier | Diameter mils |
|---|---|---|---|---|
| A | unsteamed | — | 2605 | 22.4 |
| Aa | 124 | 0.07 | 2670 | 22.7 |
| Ab | 100 | 0.43 | 2400 | 21.5 |
| Ac | 128 | 0.43 | 2400 | 21.5 |
| Ad | 128 | 1.43 | 2470 | 21.8 |
| B | unsteamed | — | 2630 | 22.5 |
| Ba | 110 | 1.00 | 2650 | 22.6 |
| C | unsteamed | — | 1840 | 18.8 |
| Ca | 130 | 0.54 | 1840 | 18.8 |
| Da | 135 | 1.00 | 2650 | 22.6 |
| Db | 120 | 0.10 | 2675 | 22.7 |
| Dc | 132 | 0.12 | 2645 | 22.6 |
| E | unsteamed | — | 2520 | 22.0 |
| Ea | 75 | 0.31 | 2555 | 22.2 |
| Eb | 95 | 0.43 | 2540 | 22.1 |
| Ec | 108 | 0.88 | 2570 | 22.2 |
| F | unsteamed | — | 2715 | 22.8 |
| Fa | 90 | 0.43 | 2755 | 23.0 |
| G | unsteamed | — | 1860 | 18.9 |
| Ga | 90 | 0.36 | 1865 | 18.9 |

TABLE II

PHYSICAL PROPERTIES

| Monofilament | Tenacity g.p.d. | Loop Tenacity g.p.d. |
|---|---|---|
| A | 8.7 | 0.9 |
| Aa | 8.2 | 2.6 |
| Ab | 8.7 | 1.5 |
| Ac | 8.5 | 4.5 |
| Ad | 7.5 | 3.6 |
| B | 7.9 | 0.8 |
| Ba | 7.7 | 4.0 |
| C | 8.4 | 1.5 |
| Ca | 8.0 | 3.8 |
| Da | 3.4 | 1.6 |
| Db | 4.0 | 3.6 |
| Dc | 4.4 | 4.0 |
| E | 8.9 | 1.2 |
| Ea | 9.1 | 2.4 |
| Eb | 8.9 | 3.4 |
| Ec | 8.8 | 2.4 |
| F | 8.2 | 1.6 |
| Fa | 8.0 | 4.2 |
| G | 8.0 | 1.1 |
| Ga | 8.0 | 4.3 |

TABLE III

STRUCTURAL CHARACTERIZATIONS

| Monofilament | Dye Penetration microns | % of Radius | % Dye Exhaust | Orientation Half-width (100) (degrees-chi) |
|---|---|---|---|---|
| A | 1 | 0.4 | 5 | 10.6 |
| Aa | 2 | 0.7 | 32 | — |
| Ab | 3.5 | 1.3 | 51 | — |
| Ac | 7 | 2.6 | 63 | 11.0 |
| Ad | 10 | 3.6 | 75 | — |
| B | — | — | 8 | — |
| Ba | — | — | 71 | — |
| C | 3 | 1.3 | 16 | 10.8 |
| Ca | 6.5 | 2.7 | 64 | 10.4 |
| Da | — | — | 85 | — |
| Db | — | — | 70 | 15.7 |
| Dc | — | — | — | — |
| E | 2.3 | 0.8 | 15 | 7.9 |
| Ea | 4 | 1.4 | 46 | — |
| Eb | 7.5 | 2.7 | 56 | 7.8 |
| Ec | 10 | 3.6 | 64 | — |
| F | 2 | 0.7 | 25 | — |
| Fa | 15 | 5.1 | 57 | 8.1 |
| G | 2.5 | 1.0 | 9 | 11.3 |
| Ga | 8 | 3.4 | 55 | 11.0 |

EXAMPLE VII

Monofilaments are shown which are produced from a copolymer composed of 90 parts by weight polyhexamethylene adipamide and 10 parts by weight poly-$\epsilon$-caproamide (RV= 45). The unsteamed monofilament, G, is drawn 6.2X; the steamed monofilament, Ga, is drawn only 5.8X before steaming. G is very deficient in loop tenacity, adhesion, and dye penetration. Ga has all the improved characteristics of a monofilament of this invention.

EXAMPLE VIII

A filament of polyhexamethylene adipamide containing 2 percent lithium bromide (as exemplary of many operable halides) is made by drawing in two stages at a draw ratio of 4.0X thence 1.47X for a total draw ratio of 5.8X. It is 22 mils in diameter. A length of the drawn filament is treated with 94–96 percent quality steam at 130 p.s.i.g. for 0.45 second in a manner generally similar to that described hereinabove. The properties of the monofilament are: break strength 49.3 pounds; elongation at break 16.9 percent; straight tenacity 120,000 p.s.i. and loop tenacity (6 inch length) 48,000 p.s.i. (measured on an Instron Tester at 24° C. and 55 percent RH using an elongation rate of 60 percent/minute). This steam-treated monofilament is dipped in a conventional adhesive resorcinol-formaldehyde latex dip, treated at 325° F. with 1.5 percent applied stretch for 2.0 minutes, and at 420° F. with 3.0 percent applied stretch for 0.6 minute. The steam-treated monofils are tested in rubber stock and in tires by normal testing procedures and found to provide excellent adhesion to rubber stock and superior flex life and plunger energy in tires when compared to conventional tire cords or untreated controls. Filaments made with lower draw ratio having a tenacity of at least 110,000 p.s.i. and a loop tenacity of at least 33,000 p.s.i. are also found to be satisfactory when tested in tires.

EXAMPLE IX

Polyhexamethylene adipamide resin pellets are coated with 0.5 percent by weight of a binder composition, "Santicizer 8" (a mixture of o- and p-N-ethyl toluenesulfonamides, manufactured by Monsanto Company) which aids in binding salt crystals on the resin surface. The poly(hexamethylene adipamide) "Santicizer 8" mixtures are tumbled in a container for three hours after which 2 percent by weight of lithium bromide which was previously dried at 110° C. for 16 hours is added. This mixture was permitted to tumble for an additional three hours. The polyhexamethylene adipamide resin composition is then allowed to dry in a vacuum oven at 110° C. for 16 hours with a small bleed of nitrogen to keep out any air. This composition is extruded through a 1 ¼ inch single screw extruder which is coupled with a metering gear pump. A spinning head having a 60 mil diameter round hole die is arranged for vertically spinning the monofilament into a quench tank located below the spinning head. The quench tank contains water which is cooled by circulation through an external cooler. The drawing apparatus consists of feed rolls, first and second stage draw rolls with typical skew rolls stands, and first and second stage tubular 1 ¼ inch diameter furnaces with exposed electric resistance coils in ceramic blocks.

Samples of drawn filaments are prepared from the poly(hexamethylene adipamide) — lithium bromide composition. Processing data are given below:

Sample

| | |
|---|---|
| Melt Temperature | 280°–300° C. |
| Screw Pump Pressures: | |
| Screw | 660–860 p.s.i.g. |
| Pump | 400–750 p.s.i.g. |
| Quench Temperature | 15°–18° C. |
| Drawing Speeds (1st stage) | |
| In | 50 ft./min. |
| Out | 210 ft./min. |
| Drawing Speeds (2nd stage) | |
| In | 210 ft./min. |
| Out | 275 ft./min. |
| Total Draw Ratio = 275/50 = 5.5 | |

In addition to spinning and drawing, the filaments are steam treated with 110 p.s.i.g. steam to improve adhesion and to surface relax the filaments so that transverse properties such as loop strength are improved.

The following table describes the properties of the monofilaments prepared by the above procedure.

TABLE IV

| Total draw ratio | Filament diameter (drawn) | Tensile strength (p.s.i.) | Modulus (p.s.i.) | Elongation (percent) | Observations |
|---|---|---|---|---|---|
| 5.5 | 21.7–22.5 | 126,000 | 838,000 | 27.2 | No draw breaks during 1½ hrs. |
| 5.5 | 21.9–22.6 | 119,000 | 790,000 | 24.5 | Do. |

EXAMPLE X

This example compares performance of standard four-ply bias tires containing monofilament of polyhexamethylene adipamide (with 2 percent Li Br) with equivalent tires of commercial 66-nylon cord. The monofilament is nominally 18 mils in diameter; the cord is formed from two 840-denier 140-filament yarns. All tires are as nearly identical as possible, ends per inch of yarn being adjusted to provide essentially equal carcass strength (CS) where CS is the product of: (1) in-rubber breaking strength in pounds, (2) ends per inch of cord in the cured cord fabric, and (3) the number of plies.

The extruded and drawn monofilament has a denier of 1,750, a tenacity of 8.8 grams/denier, a loop-tenacity of 0.4 grams/denier, and an in-rubber breaking strength of 32.2 lbs. It is used to construct tires R. After steaming substantially as described for Ac of Example I, the monofilament has a denier of 1,850, a tenacity of 8.1 grams/denier, a loop-tenacity of 2.9 grams/denier, and an in-rubber breaking strength of 3.45 pounds. Tires S are prepared from the steam-treated monofilament. The 1,680 denier (total) commercial cord has a tenacity of 7.8 grams/denier, a loop-tenacity of 4.5 grams/denier and an in-rubber breaking strength of 30 pounds. It is used to construct tires T.

Tires R, S, and T are subjected to 3,000 miles of a standard flex test in which tire inflation is 18 p.s.i.g., speed is 35 miles/hour, and the tire is loaded so the distance between the running surface and the tire bead is 21 percent less than the same distance under no load. One of two tires R fails at 2,866 miles. Immediately thereafter, for the remaining tires, inflation is reduced to 16 p.s.i.g., speed increased to 50 miles/hour, and load adjusted to 125 percent of T.R.A. (Tire & Rim Manufacturers) rated load. Tire R survives only 5 additional miles. Two tires S survive 1,758 and 3,567 additional miles respectively. Tires T survive from 2,000 to 3,000 additional miles. Significantly, cords dissected from tires T after testing show a major loss in tenacity while monofilaments from tires S show very little strength loss.

Tires R and S are compared in plunger energy. A 0.75 inch diameter plunger is forced into the tire, inflated to 24 p.s.i.g., at a constant 2 inch/minute rate. Plunger energy in inch-pounds is the integrated plunger-load vs. plunger-displacement which results up to the instant of failure. Six penetrations for each test are averaged. Tire R has a plunger energy of 2,930 in.-lbs.; Tire S yields 3,920 in.-lbs. The improvement upon steaming the monofilament is seen to be very significant. A closely related strength measurement is PL/CS where PL is maximum plunger load at failure in pounds and CS is carcass strength. The PL/CS results are: 0.50 (R), 0.55 (S), and 0.48–0.50 (T).

Finally, a special high-speed endurance test is used to compare tires S and T. The tires are inflated to 24 p.s.i.g. and loaded at 100 percent of the T.R.A. rated load. In this test the tires are run for 3,000 miles at 75 miles/hr., 500 more miles at 80 miles/hour, 500 more miles at 85 miles/hour, etc. until failure results. The two tires are equivalent in this test, each just completing 5,000 miles (total).

The monofilaments of the invention are prepared from polyamides containing at least 90 percent by weight of either polyhexamethylene adipamide (nylon 6/6) or polycaproamide (nylon 6). In the case of copolymers, the minor ingredient may be constituted by other polyamide-forming components including hexamethylene diamine and adipic acid, caprolactam (Example VII), and hexamethylene diamine and isophthalic acid. The preferred polyamides are polyhexamethylene adipamide and polycaproamide.

The monofilaments of the invention not only possess high tenacity but also provide high loop tenacity and excellent adhesion. The latter two properties have been lacking in monofilaments previously proposed for replacing nylon tire cords. The use of monofilament in this area eliminates the costly steps of twisting and cording. In spite of these known advantages, synthetic polymeric monofilament has not been accepted in place of cord because it has not provided equivalent strength and durability in tires. This invention overcomes such deficiencies.

What is claimed is:

1. A polyamide monofilament having a diameter of at least 15 mils, a straight tenacity greater than 7.5 grams per denier and a loop tenacity greater than 2.3 grams per denier, said monofilament having a microporous surface layer surrounding a core portion, the surface layer having a thickness of from 3 to 15 microns as measured by dye penetration and constituting less than 6 percent of the transverse radius of the monofilament and the said monofilament having an X-ray orientation half-width that is no greater than about 12.5 degrees-chi.

2. The monofilament of claim 1 wherein the polyamide is selected from the group consisting of poly-$\epsilon$-caproamide, polyhexamethylene adipamide and copolymers containing at least 90 percent by weight of poly-$\epsilon$-caproamide or polyhexamethylene adipamide.

3. The monofilament of claim 1 wherein the polyamide is polyhexamethylene adipamide.

4. The monofilament of claim 1 wherein the polyamide is poly-$\epsilon$-caproamide.

5. The monofilament of claim 1 wherein the microporous surface layer has a thickness of between 5 and 10 microns.

6. The monofilament of claim 1 wherein the microporous surface layer is characterized by a dye-exhaustion of 50 to 65 percent.

* * * * *